July 10, 1934.   W. FERRIS ET AL   1,965,696
GRINDING MACHINE
Original Filed April 15, 1927    3 Sheets-Sheet 3
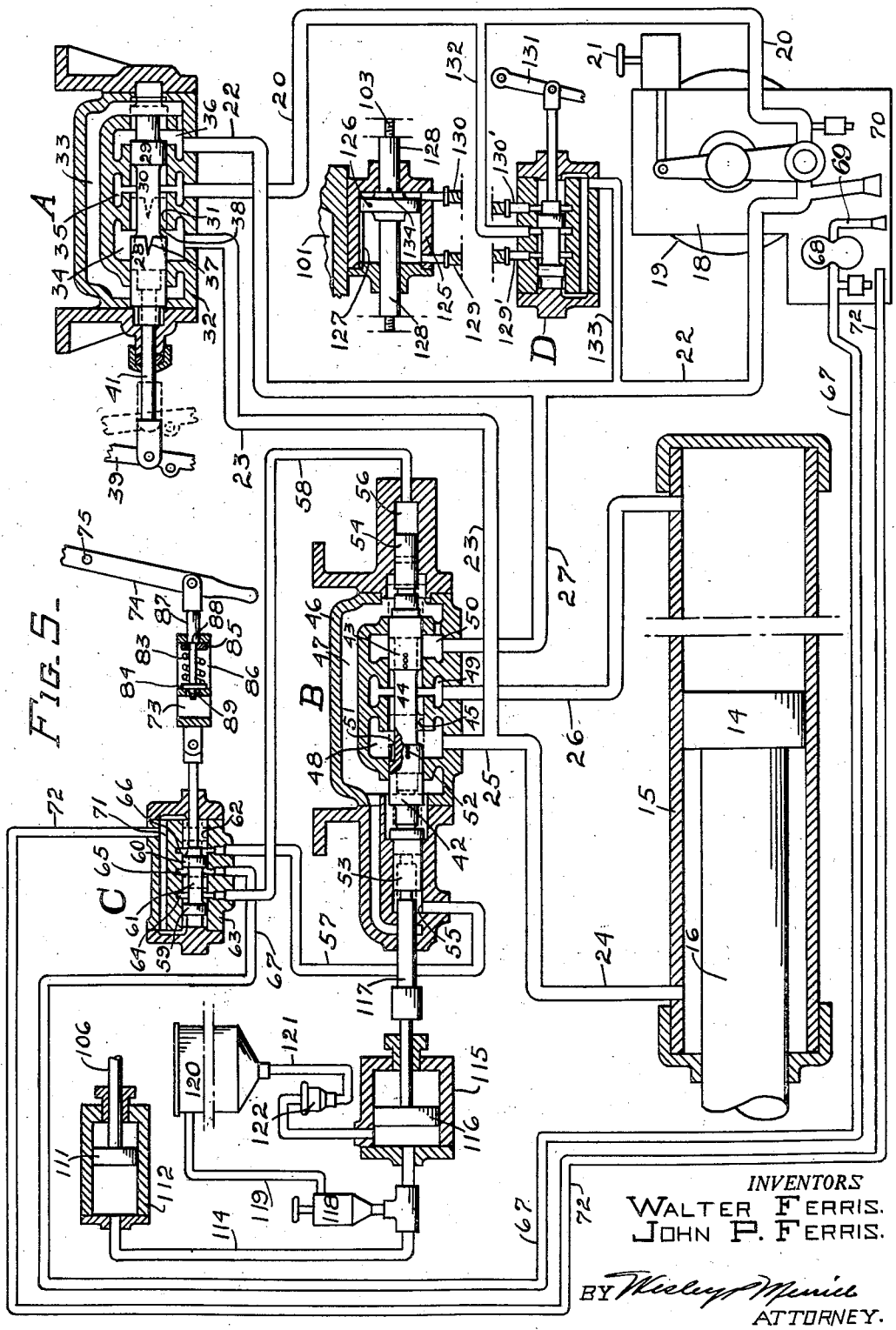
INVENTORS
WALTER FERRIS.
JOHN P. FERRIS.
BY *Wesley Meriuls*
ATTORNEY.

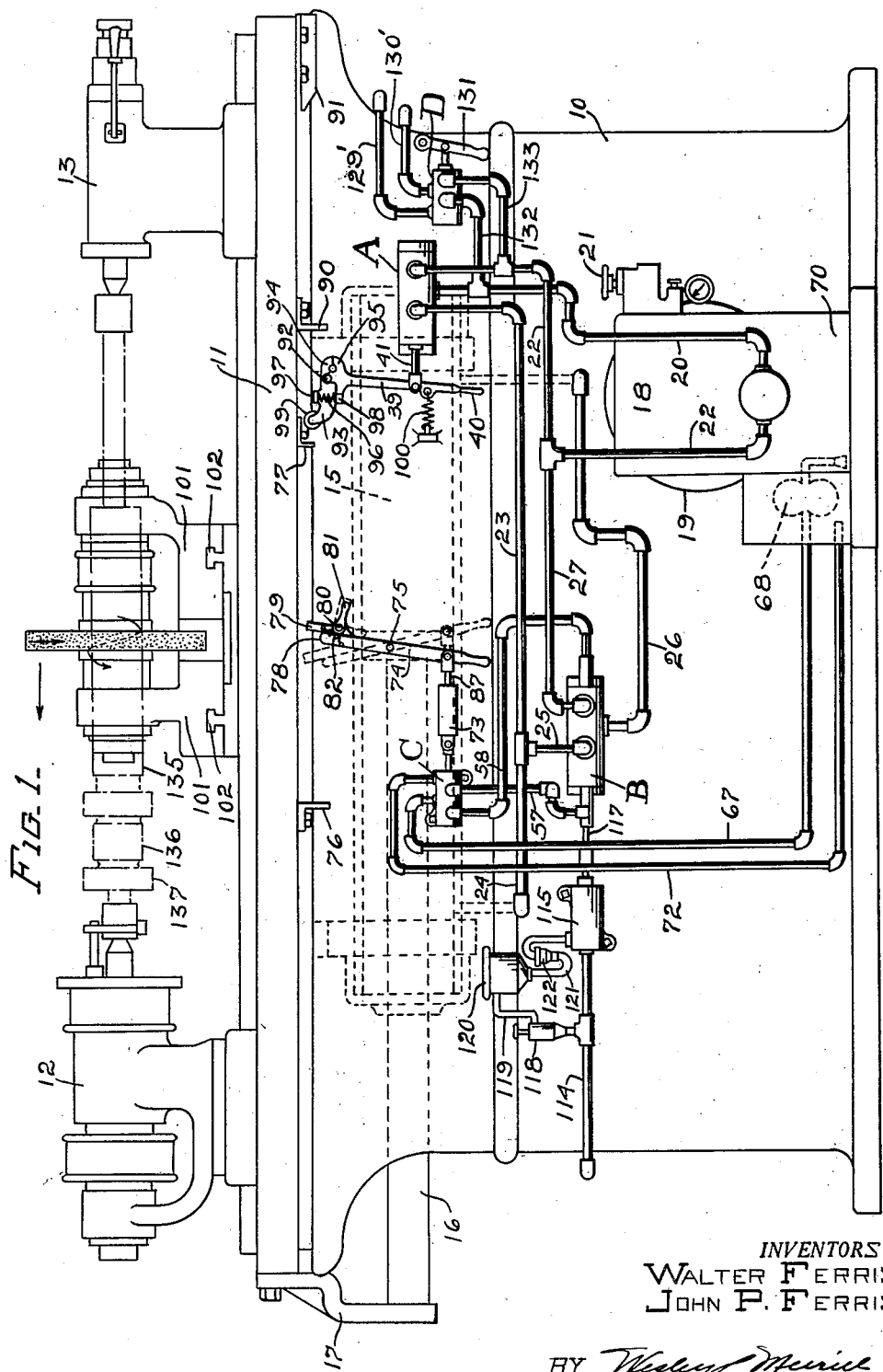

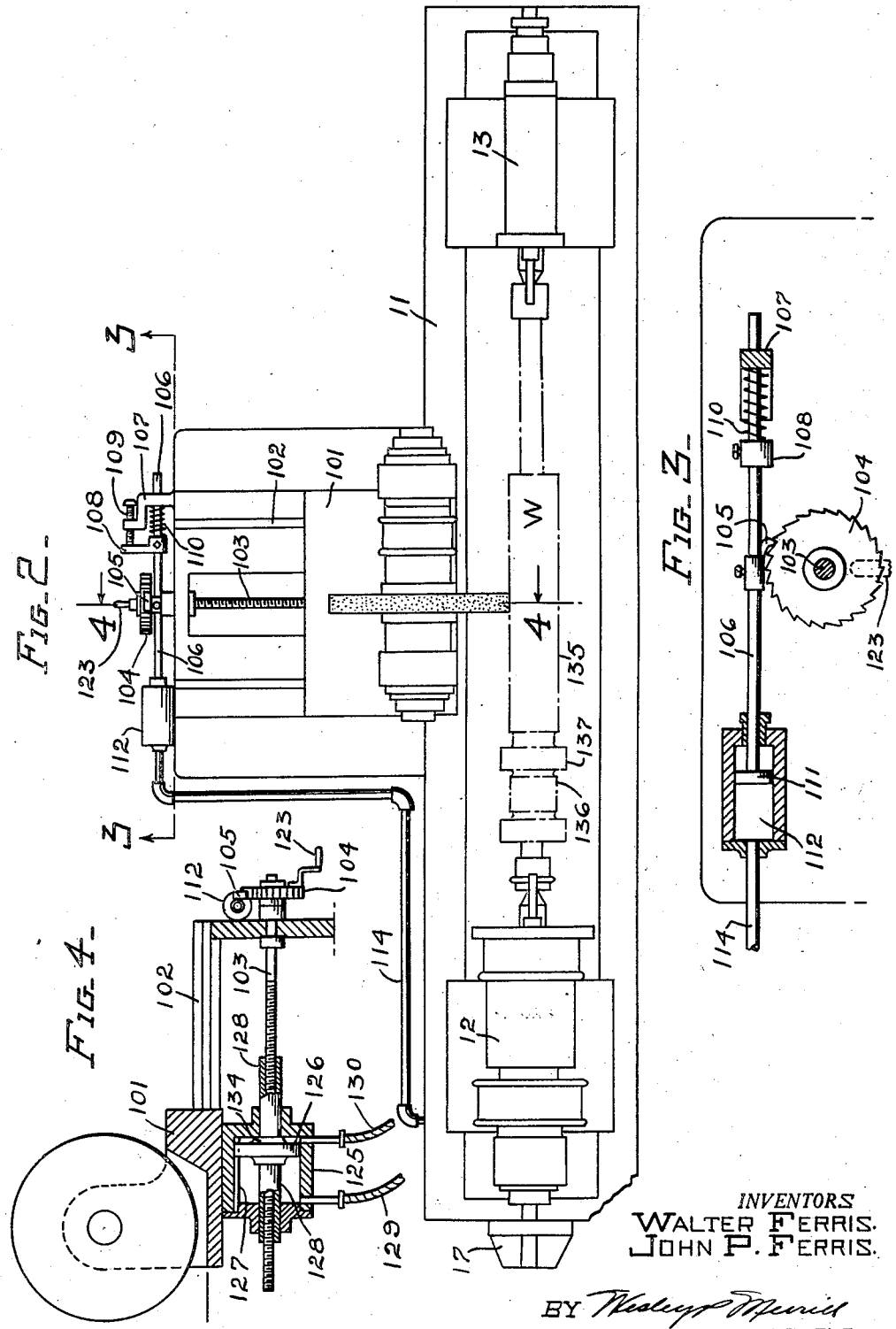

Patented July 10, 1934

1,965,696

UNITED STATES PATENT OFFICE 1,965,696

GRINDING MACHINE

Walter Ferris, Milwaukee, Wis., and John P. Ferris, Fountain City, Tenn., assignors to The Oilgear Company, Milwaukee, Wis., a corporation of Wisconsin Continuation of application Serial No. 183,960, April 15, 1927. This application December 30, 1931, Serial No. 583,888

15 Claims. (Cl. 51—95)

This application is a continuation of application Serial No. 183,960, filed April 15, 1927.

The invention relates to a hydraulic drive for a machine tool which has a reciprocable table or carriage for moving the tool and the work into and out of engagement with each other, such as a grinding machine.

The grinding machine to which the invention is particularly adapted is provided with a table, which reciprocates longitudinally of the machine and carries the work, and with a carriage which carries a grinding wheel and is reciprocable transversely of the machine to move the wheel into and out of engagement with the work.

During the grinding operation, the grinding wheel is ordinarily advanced intermittently toward the work in the proper relation to table reciprocation, and the work is occasionally moved beyond the wheel and the table stopped in order to measure the work.

Certain classes of work require grinding upon a surface arranged between two shoulders or collars which prevent the work from being moved beyond the wheel unless the carriage is retracted sufficiently to allow the wheel to clear those shoulders or collars. The wheel must then be readvanced into engagement with the work to complete the grinding operation.

The invention has as an object to provide a machine in which one part or carriage is operated and controlled by hydraulic means and another part or carriage is operated by liquid supplied by a pump which is driven by the hydraulic means.

Another object is to retract a grinding wheel or other tool from engagement with the work and then readvance it to the exact point from which it was retracted.

Another object is to retract and readvance a tool at high speed.

Other objects and advantages will appear from the following description of the embodiment illustrated in the accompanying drawings in which the views are as follows:

Fig. 1 is a front view of a hydraulically operated grinding machine to which the invention has been applied.

Fig. 2 is a top plan view thereof.

Fig. 3 is a view taken on the line 3—3 of Fig. 2 and showing details of the mechanism which feeds the grinding wheel toward the work.

Fig. 4 is a somewhat diagrammatic view showing the feed mechanism and the mechanism for retracting and readvancing the grinding wheel at high speed.

Fig. 5 is a view showing details of valve construction and a schematic arrangement of the hydraulic circuit.

The grinder selected for illustration has a main frame 10 upon which a work table 11 is mounted for lengthwise reciprocation. The table carries the usual head and tail stocks 12 and 13 and is driven by a piston 14 working within a cylinder 15 which is arranged in a stationary position within the frame 10.

The piston 14 is provided with a piston rod 16 which projects through one end of the cylinder and is connected to a bracket 17 depending from one end of the table.

For reasons which will hereinafter appear, the cross-sectional area of the piston rod is one-half the cross-sectional area of the piston so that the effective pressure area of one face of the piston is one-half that of the other face. The capacity of that end of the cylinder containing the piston rod is thus one-half that of the other end and will be hereinafter referred to as the small end.

The piston is driven by liquid supplied at regulated volumetric rates from an appropriate source, such as a pump 18 which is ordinarily of the multiple piston variable displacement type, such as the pump described and claimed in Patent No. 1,558,002, issued October 20, 1925, to Walter Ferris. It will suffice here to state that this pump is driven at constant speed through appropriate means, such as a pulley 19, and that it delivers liquid through a supply pipe 20 at a rate dependent upon the adjustment of a control handwheel 21. By adjusting this hand-wheel, the rate of flow through pipe 20 may be varied from zero to a maximum. Liquid returns to the pump through a return pipe 22.

The pipe 20 leads to a regulating valve A preferably, though not necessarily, such as will be hereinafter described. This valve controls communication between the supply pipe 20 and the return pipe 22 and between the pipe 20 and a pipe 23 which communicates with the small end of the cylinder 15 through a pipe 24. Pipe 23 also communicates with a pipe 25 leading to a reversing valve B, preferably such as will be hereinafter described.

The valve B controls communication between pipe 25 and a pipe 26, which leads therefrom to the large end of the cylinder 15, and between pipe 26 and a pipe 27 which is connected to the pump return pipe 22 intermediate the ends thereof.

The arrangement is such that, when valve A is set to establish communication between pipes 20 and 23, liquid supplied therethrough from the pump drives the piston 14 in one direction or the other dependent upon the position of valve B.

That is, when valve B is in such position as to close communication between pipes 25 and 26, liquid will flow through pipes 23 and 24 to the small end of the cylinder only and cause the piston 14 and table 11 to travel toward the right at a rate corresponding to the rate of liquid flow.

In this position of valve B, pipe 26 is open to pipe 27 so that liquid expelled from the large end of the cylinder is returned to the pump through pipes 26, 27 and 22.

When valve B is shifted into such position as to open communication between pipes 25 and 26 and to block communication between pipes 26 and 27, both ends of the cylinder 15 are exposed to the pressure in pipe 23 and the piston 14 and table 11 travel toward the left due to the difference in the effective pressure areas of the piston faces.

During this movement, the liquid discharged from the small end of the cylinder flows through pipe 24 into pipe 25 where it joins the liquid supplied from pipe 23 and passes with this liquid through pipe 26 into the large end of the cylinder.

Since the capacity of the large end of the cylinder is double that of the small end, the liquid discharged from the small end added to the normal flow through pipe 23 will cause the piston to travel toward the left at the same rate at which it travels toward the right.

Valves A and B are shown in detail in Fig. 5.

As therein shown, valve A comprises a piston having two spaced heads 28 and 29 connected by a reduced portion 30 and closely fitted for lengthwise reciprocation within a cylindrical bore 31 formed in a housing 32. The opposite ends of the bore 31 are in open communication through a passage 33. Three annular chambers 34, 35 and 36 surround the bore. Chamber 34 communicates with pipe 23, chamber 35 with pipe supply 20 and chamber 36 with the return pipe 22.

Chamber 35 communicates at all times with the annular space surrounding the reduced portion 30 of the piston. Communication between this space and chamber 34 is controlled by the head 28, and communication between this space and chamber 36 is controlled by the head 29.

The head 28 is preferably formed with a series of outwardly flaring V-shaped grooves 37 which open to the space surrounding the reduced portion 30 of the piston and cooperate with the edge 38 of chamber 34 to effect a fine regulation of the flow of liquid from this space to chamber 34.

The arrangement is such that, when the piston is at the extreme left in the position shown in full lines, head 29 blocks communication between chambers 35 and 36, and head 28 is so positioned that chamber 35 is open to chamber 34 so that the entire discharge from the pump is delivered through pipe 20 and chambers 35 and 34 to the pipe 23.

When the piston is at the extreme right as indicated by dotted lines, head 28 blocks communication between chambers 35 and 34 and communication is established between chambers 35 and 36. The entire output of the pump is then by-passed through pipe 20, chambers 35 and 36 and the return pipe 22.

In intermediate positions of the valve, chamber 36 is closed by the head 29 and chamber 34 is closed to chamber 35 by the head 28 except for such flow as is permitted through the grooves 37, and this flow is nicely regulated by adjusting these grooves relatively to the edge 38. A finely graded throttling action is thus available by which the flow in pipe 23 may be reduced to any desired degree to effect a correspondingly slow motion of the piston 14 and table 11.

The piston of the valve A is controlled by a lever 39 which is provided with an appropriate handle 40 and connected to the stem 41 of the valve piston.

The valve B is of the same type as valve A and is provided with a piston having two heads 42 and 43 which are connected by a reduced portion 44 and closely fitted for reciprocation in a bore 45 formed in a housing 46. The opposite ends of the bore 45 are in open communication through a passage 47, and three annular chambers 48, 49 and 50 surround the bore.

Pipe 25 leads to chamber 48, pipe 26 leads from chamber 49, and pipe 27 leads from chamber 50. Head 42 controls communication between chambers 48 and 49, and head 43 controls communication between chambers 49 and 50.

When the piston is at the extreme left in the position shown in full lines, chamber 50 is closed by head 43 and chamber 48 is open to chamber 49 so that liquid admitted through pipe 25 is directed into pipe 26.

When the piston is at the extreme right as indicated in dotted lines, chamber 48 is closed by head 42 and chamber 49 is open to chamber 50 so that pipe 26 is then open to the return side of the pump through pipe 27.

As hereinabove pointed out, the valve B causes reversal of the piston 14 and table 11 by opening the large end of the cylinder to pipe 23 and to pipe 22 alternately.

In order to obtain a smooth reversal, this valve is preferably so formed as to produce a graduated throttling action upon the liquid during adjustment of the piston thereof from one extreme position to the other. For this purpose, the adjacent ends of the piston heads 42 and 43 are provided with bypass ducts which function in a manner similar to the V-shaped grooves 37 of valve A.

In the valve shown, a plurality of bores 51 are drilled through the end face of each head and a series of ports 52, communicating with each bore, are formed in the peripheral face of the head. The ports of each series are open or close successively by movement of the valve piston through intermediate positions, thus effecting a graduated throttling of the flow of liquid between chambers 48 and 49 between chambers 49 and 50 during such movement.

In the system shown, valve B is hydraulically actuated; the opposite ends of the piston thereof being reduced to provide plungers 53 and 54 which are closely fitted, respectively, in appropriate bores 55 and 56 formed in the end heads of the valve housing 46 and communicating, respectively, with the pipes 57 and 58 through which fluid pressure is applied to the ends of the plungers 53 and 54 alternately.

The flow of liquid through the pipes 57 and 58 is controlled by a pilot valve C which, as shown in Fig. 5, may include a piston having two heads 59 and 60 connected by a reduced portion 61 and closely fitted for reciprocation in a bore 62 formed in a housing 63. Three annular grooves 64, 65 and 66 are formed in the wall of the bore 62.

Groove 64 communicates with pipe 58 and groove 66 with pipe 57. The intermediate groove 65 communicates through a supply pipe 67 with an appropriate fluid pressure source, such as an auxiliary pump 68 carried by the casing of the main pump 18.

The pump 68 is ordinarily a standard type of gear pump which is driven in unison with the main pump 18 and draws liquid through a pipe 69 from a reservoir provided in the base 70 of the main pump casing, as illustrated and described in Patent No. 1,558,002 referred to above.

The opposite ends of the bore 62 of the valve C are always in open communication through a passage 71 and this passage is open to a drain pipe 72 which discharges into the reservoir 70.

The arrangement is such that, with the piston of valve C at the left as shown in full lines in Fig. 5, intermediate groove 65 is open to groove 64 and liquid from the supply pipe 67 is free to enter pipe 58 and thereby force the piston of valve B toward the left, and groove 66 is open to the passage 71 so that pipe 57 is open to the drain pipe 72.

By shifting the piston of the valve C to the extreme right into the position shown in dotted lines, groove 66 is opened to groove 65 so that liquid from supply pipe 67 flows through pipe 57 to the bore 55 and forces the piston of valve B to its extreme position at the right, and liquid from the bore 56 of valve B is expelled through pipe 58, groove 64, and passage 71 to the drain pipe 72.

The valve C may be placed under the control of the table 11 so as to effect an automatic reversal thereof and thereby cause the table to reciprocate continuously within a predetermined range. To this end, the piston of valve C is connected through appropriate linkage 73 with the lower end of a lever 74 which is pivoted intermediate its ends upon a pin 75 fixed to the frame 10 of the machine.

The lever 74 projects upwardly into the path of movement of a stop 76 which is secured in adjusted position to the table 11 in alinement with a second stop 77 also adjustably fixed thereto.

The stop 77 is somewhat shorter than stop 76, so as to clear the upper end 78 of the lever, but is long enough to engage an extension element 79 which is pivoted upon a pin 80 carried by the lever 74.

The element 79 is provided with an appropriate handle 81 by which it may be adjusted into the upright position shown in full lines in Fig. 1 or into the horizontal position shown in dotted lines. A spring 82 serves to yieldably retain this element in either position.

The operation of the parts thus far referred to will now be briefly described. With the pistons of the three valves A, B and C in their extreme left positions, as indicated in full lines in Fig. 5, liquid discharged from pump 18 flows through pipe 20, valve A, pipes 23 and 25, valve B and pipe 26 to the large end of cylinder 15 and moves the piston 14 and table 11 toward the left. During this movement, liquid is expelled from the small end of the cylinder and directed into the large end thereof through pipes 24 and 25, valve B and pipe 26. At this time, the lever 74 is in the full line position shown in Fig. 1.

The table continues to travel toward the left until the stop 77 strikes the extension element 79 on the lever 74 and rocks the lever into the dotted line position of Fig. 1, thereby shifting the piston of valve C to the extreme right into the dotted line position of Fig. 5.

Liquid then flows from pipe 67 through valve C and pipe 57 into the bore 55 of the valve B and shifts the piston of this valve to the right into the position shown in dotted lines. When so shifted, pipe 25 is blocked and liquid flows through pipes 23 and 24 to the small end of the cylinder and moves the piston 14 and the table 11 toward the right. The liquid expelled from the large end of the cylinder flows through the pipe 26, valve B and pipes 27 and 22 back to the pump. The piston 14 and table 11 are thus reversed and travel toward the right.

The table continues to move toward the right until stop 76 strikes the end 78 of lever 74 and returns the lever into the full line position of Fig. 1, thereby returning the piston of valve C into the left extreme full line position of Fig. 5, and opening pipe 58 to supply pipe 67 to allow liquid to enter the bore 56 and return the piston of valve B to its initial position as shown in full lines. The piston 14 and table 11 are thus again reversed and travel toward the left.

The table will continue to reciprocate through a definite range, as determined by the setting of the stops 76 and 77, and at a velocity determined by the rate of liquid flow in pipe 23.

This rate of flow may be regulated by adjusting the hand-wheel 21 to vary pump displacement, but pump displacement is seldom varied except to vary the normal operating speeds. Slow table movements, such as are advantageously used when lining up the machine for a fresh piece of work, are ordinarily obtained by adjusting the valve A in the manner hereinafter described. This valve is also used to stop and start the table at any point during the reciprocation thereof or at the completion of a grinding operation.

In order to avoid injury to the valve C or associated parts that might otherwise result from an overtravel of the table 11 at the end of a stroke in either direction, a yieldable connection is provided within the linkage 73 which connects the lever 74 to the valve C.

This connection, shown particularly in Fig. 5, has a compression spring 83 confined between two washers 84 and 85 which bear against the end walls of a housing 86 connected to the piston of the valve C.

A rod 87, which has one of its ends connected to the lever 74 intermediate the ends thereof, projects through the washers 84 and 85 and is provided intermediate its ends with a shoulder 88 which abuts the washer 85. The other end of the rod is provided with a nut 89 which abuts the washer 84.

The washer 85, under the pressure of the spring and acting against the shoulder 88, offers a yielding resistance to movement of the rod inwardly of the housing, and the washer 84, under the pressure of the spring and acting against the nut 89, offers a yielding resistance to movement of the rod outwardly of the housing.

Provision is also made in the machine shown by which, at the will of the operator, the table 11 may be permitted to travel to a predetermined point beyond the normal reciprocating range determined by the stops 76 and 77. For this purpose, a third stop 90 is adjustably fixed to the table in line with the stops 76 and 77 and so arranged as to engage the upper end 78 of lever 74.

The arrangement is such that, by rocking the element 79 into its depressed position (shown in dotted lines in Fig. 1), it will clear stop 77 and permit the table to continue movement toward the left.

The table continues to travel toward the left until the upper end 78 of the lever 74 is struck by the stop 90 and rocked into the dotted line position shown in Fig. 1. When this occurs, the valve C is reversed.

The reversal of valve C would ordinarily reverse the table 11 and cause it to again start traveling toward the right were it not that the valve A is operated automatically at this time to stop the flow in the pipe 23.

The valve A is operated by a cam 91 which is adjustably fixed to the table and operates the lever 39 at substantially the same time that lever 74 is actuated by the stop 90.

The lever 39 is pivoted upon a pin 92 which is fixed to the main frame of the machine. An arm 93, also pivoted upon the pin 92, is provided with a stop lug 94 which is normally in engagement with a cooperating lug 95 carried by the lever 39. A compression spring 96, interposed between the cooperating lugs 97 and 98 on the arm and lever respectively, yieldably retains the lugs 94 and 95 in engagement so that the arm 93 normally functions as an extension of the lever. The arm 93 carries a roller 99 for cooperation with the cam 91.

The arrangement is such that cam 91 strikes the roller 99 about the time that stop 90 strikes the end 78 of lever 74 and, when the roller 99 is depressed by the cam 91, the arm 93 swings the lower end of the lever 39 toward the right, thereby shifting the piston of the valve A to the extreme right as shown in dotted lines in Fig. 5.

The valve A then directs the liquid supplied through pipe 20 into and through pipe 22 back to the pump, with the result that the flow in pipe 23 ceases and the table comes to rest.

As the lever 74 is operated substantially simultaneously with the lever 39, the plungers of the valves C and B will have been shifted to the extreme right when the table comes to rest so that pipe 25 is blocked and pipe 26 is open to discharge pipe 27.

To restart the machine, it is only necessary for the operator to swing the lever 39 toward the left against the pressure of the spring 96 and thereby move the plunger of the valve A to the left to allow liquid to flow through the pipes 23 and 25 to the left end of the cylinder 15 and move the piston 14 and the table 11 to the right.

The operator holds the lever in this position until the cam 91 has cleared the roller 99, after which the arm 93 reassumes the position shown in Fig. 1.

The lever 39 may be yieldably retained in the position shown by a spring 100 which is sufficiently resilient to permit the lever 39 to be swung toward the right by the action of the cam 91 against the roller 99.

The machine shown is also provided with the usual grinder carriage 101 mounted upon the main frame 10 for transverse movement along the usual ways 102 toward and from the work. The carriage is fed by a screw 103 which is journaled in the frame 10 and has a ratchet wheel 104 fixed to the outer end thereof.

The ratchet wheel 104 is driven intermittently by a pawl 105 pivoted upon and actuated by a push rod 106 which has its right end guided in an appropriate bracket 107 fixed to the machine frame.

The rod 106 has a stop 108 adjustably fixed thereon to cooperate with a stop screw 109 which is threaded through the bracket 107 and limits the movement of the rod toward the right.

The rod 106 is urged toward the left by a helical compression spring 110 which encircles the rod between the bracket 107 and the stop 108.

The left end of the rod 106 has a piston 111 fixed thereon and fitted in a cylinder 112 to which liquid is delivered through a pipe 114 to move the piston 111 and the rod 106 to the right.

The pipe 114 provides a permanent hydraulic connection between cylinder 112 and a similar cylinder 115 which has a piston 116 fitted therein and connected directly to the stem 117 of the valve B for reciprocation therewith.

The pipe 114 has connected thereto a pressure relief valve 118 of well known construction through which excess liquid may escape from pipe 114 through a pipe 119 to a reservoir 120 which is preferably provided for maintaining the pipe 114 and cylinders 112 and 115 flooded with liquid at all times to thereby avoid accumulation of air therein.

The reservoir 120 is connected to the cylinder 115 through a pipe 121 which has an appropriate type of check valve 122 connected therein to permit free flow of liquid from reservoir 120 to cylinder 115 but prevents flow in the opposite direction.

The arrangement is such that, as the piston of valve B is shifted toward the left to reverse the table in the manner hereinabove described, the piston 116 is driven inwardly, thereby forcing liquid through pipe 114 into cylinder 112 and forcing the piston 111 and rod 106 toward the right. The movement of the rod toward the right is limited by the coacting stops 108 and 109, thereby effecting a predetermined rotation of the screw 103 by the action of the pawl upon the ratchet wheel 104 and resulting in a predetermined advance of the carriage 101 each time the table 11 reaches the end of its stroke toward the left.

The stop 109 limits the stroke of piston 111, but the piston 116 may be moved by the valve B through a full stroke as the relief valve 118 permits liquid to escape during continued movement of piston 116.

When the table 11 reaches the end of its stroke to the right and the piston of valve B is shifted toward the right to reverse the table, the piston 116 is drawn outwardly and piston 111 is forced inwardly by the action of spring 110, thereby moving rod 106 toward the left and moving the pawl 105 behind another tooth on the ratchet wheel 104.

The movement of piston 116 toward the right reduces the pressure of the liquid in pipe 114 and cylinders 112 and 115 and allows liquid to enter cylinder 115 from the reservoir 120 and replace liquid previously expelled or lost through leakage.

The ratchet wheel 104 may have a hand crank 123 attached thereto by means of which the screw 103 may be rotated to move the grinding wheel manually toward and from the work, the pawl 105 being swung out of engagement with the ratchet wheel during retraction of the grinding wheel.

In the machine shown, provision is also made for effecting, at the will of the operator, a quick withdrawal of the carriage 101 from the work and a subsequent return of the carriage into the exact position occupied before the withdrawal.

Although this might be accomplished in various ways, the specific means shown in Fig. 4 is quite satisfactory for the purpose. This means includes a cylinder 125 which is secured to the carriage 101 and has a piston 126 closely fitted for lengthwise reciprocation therein. The piston is retained against rotation by any appropriate means such as a spline or key 127.

The feed screw 103 projects through the piston and is threaded through two sleeves 128 which are rigidly secured to opposite faces of the piston 126 and extend through the ends of the cylinder 125.

The piston 126 is operated by liquid delivered to opposite end of the cylinder 125 through two conduits 129 and 130 which are preferably in the form of flexible hose.

The delivery of liquid to the cylinder is controlled by an appropriate valve D (Figs. 1 and 5) to which the conduits 129 and 130 are connected through pipes 129' and 130', respectively.

The valve D is similar in structure and function to the valve C and is controlled by a hand lever 131. Pipes 132 and 133, leading to valve D, are connected to supply pipe 20 and return pipe 22, respectively.

The arrangement is such that, when the valve D is in the position shown in Fig. 5, pipe 132 is open to pipe 129' and the left end of cylinder 125 (Fig. 4) is exposed to the pressure in the discharge pipe 20 so that the right end of the cylinder 125 is held against the shoulder 134 on the piston 126 and the carriage 101 is normally advanced toward the work by each rotation of the feed screw 103 in the manner previously described.

Whenever the operator wishes to withdraw the grinder from the work, he shifts the lever 131 toward the right and thereby adjusts the valve to open communication between pipes 132 and 130'. The right end of the cylinder 125 (Fig. 4) is then exposed to the pressure in pipe 20, and the cylinder and carriage 101 are forced to the right.

To return the carriage to its initial position, the lever 131 is returned to the position shown, thereby again exposing the left end of the cylinder 125 to the pressure in the pipe 20 and thereby returning the right end of the cylinder into contact with the shoulder 134 on the piston. This positive contact between the shoulder 134 and the end of the cylinder insures an accurate repositioning of the grinder carriage.

If the machine is employed to grind a piece of work having parts thereof of different diameters, such as the work W shown in Figs. 1 and 2, one part 135 thereof may be ground to size in the usual manner and then the operator may retract the grinding wheel by shifting the lever 131 and retract it still farther by operating the crank 123, then shift the table 11 to bring the unground part 136 of the work in line with the grinding wheel, then shift the lever 131 to readvance the grinding wheel and then operate the crank 123 to move the wheel slowly into engagement with the work, thereby avoiding the necessity of retracting the grinding wheel manually far enough to clear the collar 137 arranged between the parts 135 and 136 and then readvancing the wheel manually through the entire distance retracted.

After the part 136 has been partly ground, the lever 131 may be operated to retract the grinding wheel and allow the operator to measure the diameter of the part 136, and then the operator may operate the lever 131 to readvance the grinding wheel which will be returned with the work to the exact point from which it was retracted.

Various changes may be made in the embodiment of the invention hereinabove specially described without departing from or sacrificing any of the advantages of the invention as defined in the appended claims.

The invention is hereby claimed as follows:

1. In a grinding machine, the combination of a reciprocating table, hydraulic means for driving said table, means automatically operated at predetermined points in the path of travel of said table for reversing the same, a grinder carriage, and hydraulic means actuated by said reversing means for intermittently advancing said carriage in predetermined sequence with respect to table reciprocation.

2. In a grinding machine, the combination of a reciprocating table, means for driving said table, means automatically operated at predetermined points in the path of travel of said table for reversing the same, a grinder carriage, means including ratchet mechanism for feeding said carriage, a piston and cylinder for operating said ratchet mechanism, a piston and cylinder energized by said reversing means, and hydraulic connections between said cylinders through which said ratchet mechanism responds to movements of said reversing means.

3. The combination of a reciprocating member, hydraulic means for driving the same, control mechanism for said hydraulic means automatically operable to reverse said member to thereby effect continuous reciprocation thereof between predetermined limits, a second member, feed mechanism therefor, and hydraulic means actuated by said control mechanism during movement thereof for intermittently operating said feed mechanism.

4. The combination of a reciprocating member, hydraulic means for driving the same, a reversing valve for said hydraulic means, means responsive to movement of said member for operating said valve to thereby effect continuous reciprocation of said member between predetermined limits, a second member, feed mechanism therefor, and means actuated by movements of said valve for intermittently operating said feed mechanism.

5. The combination of a reciprocating member, hydraulic means including a pump for driving said member, an element movable to reverse said hydraulic means to thereby reverse said member, hydraulic means including an auxiliary pump for operating said element, means controlled by said member for controlling the operation of said element, a second member, and means actuated by said element for feeding said second member.

6. In a machine of the character described, the combination of a carriage, a feed screw for said carriage, a piston actuated by said screw, a cylinder coacting with said piston and connected with said carriage, a fluid pressure source, and a valve controlling communication between said pressure source and said cylinder.

7. The combination, with a machine tool having a reciprocable table, a hydraulic motor for driving the same, a valve for reversing said motor, a carriage, and feed mechanism for advancing said carriage intermittently, of means operated by said reversing valve for operating said feed mechanism, and means for retracting said carriage at high speed and for readvancing it at high speed to the exact point from which it was retracted.

8. The combination, with a machine tool having a reciprocable table, a hydraulic motor for driving the same, a valve for reversing said motor, a carriage, and feed mechanism for advancing said carriage intermittently, of hydraulic means operated by said reversing valve for operating said feed mechanism, and means for retracting said carriage at high speed and for readvancing it at high speed to the exact point from which it was retracted.

9. The combination, with a machine tool having a reciprocable table, a hydraulic motor for driving the same, a valve for reversing said motor, a carriage, and feed mechanism for advancing said carriage intermittently, of means operated by said reversing valve for operating said feed mechanism, and hydraulic means for retracting said carriage at high speed and for readvancing it at high speed to the exact point from which it was retracted.

10. The combination, with a machine tool having a reciprocable table, a hydraulic motor for driving the same, a valve for reversing said motor, a carriage, and feed mechanism for advancing said carriage intermittently, of hydraulic means operated by said reversing valve for operating said feed mechanism, and hydraulic means for retracting said carriage at high speed and for readvancing it at high speed to the exact point from which it was retracted.

11. The combination, with a machine tool having two movable members, of hydraulic means for driving one of said members and for controlling the operation thereof, a pump for supplying motive fluid to said hydraulic means, hydraulically actuated means for advancing the other of said members, and a feed pump actuated by said hydraulic means for supplying motive liquid to said hydraulically operated means to operate the same.

12. The combination, with a machine tool having two movable members, of hydraulic means for reciprocating one of said members, a pump actuated by said hydraulic means during each reciprocation of said first member, and a feed connected to the second of said members for advancing the same and operated by liquid supplied by said pump whereby said second member is advanced intermittently in a predetermined sequence in respect to the reciprocation of said first member.

13. The combination, with a machine tool having two movable members, of hydraulic means for reciprocating one of said members, a hydraulic feed motor mechanically connected to the second of said members for intermittently advancing the same, a liquid filled cylinder hydraulically connected to said feed motor, and a piston arranged in said cylinder and operated by said hydraulic means for forcing liquid from said cylinder into said feed motor to operate the same.

14. The combination, with a machine tool having two movable members, of hydraulic means for reciprocating one of said members, a hydraulic feed motor mechanically connected to the second of said members for intermittently advancing the same, a liquid filled cylinder hydraulically connected to said feed motor, a piston arranged in said cylinder and operated by said hydraulic means for forcing liquid from said cylinder into said feed motor to operate the same, and a relief valve connected between said cylinder and said feed motor to permit the escape of liquid ejected from said cylinder in excess of the requirements of said feed motor.

15. The combination, with a machine tool having two movable members, of hydraulic means for reciprocating one of said members, a hydraulic feed motor mechanically connected to the second of said members for intermittently advancing the same, a liquid filled cylinder hydraulically connected to said feed motor, a piston arranged in said cylinder and operated by said hydraulic means for forcing liquid from said cylinder into said feed motor to operate the same, a relief valve connected between said cylinder and said feed motor to permit the escape of liquid ejected from said cylinder in excess of the requirements of said feed motor, a reservoir containing liquid, and means connecting said cylinder to said reservoir and including a check valve to permit liquid to flow freely from said reservoir to said cylinder but prevent it from flowing in the opposite direction.

WALTER FERRIS.
JOHN P. FERRIS.